US011265239B1

United States Patent
Vinchurkar et al.

(10) Patent No.: US 11,265,239 B1
(45) Date of Patent: Mar. 1, 2022

(54) EXTENDED NETWORK NODE PROVISIONING IN SOFTWARE DEFINED ACCESS FABRIC NETWORKS

(71) Applicant: Cisco Technology, Inc., San Jose, CA (US)

(72) Inventors: Shashank Vinchurkar, San Jose, CA (US); Sanjay K. Hooda, Pleasanton, CA (US); Chiragkumar P. Desai, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 231 days.

(21) Appl. No.: 16/566,769

(22) Filed: Sep. 10, 2019

(51) Int. Cl.
*H04L 12/707* (2013.01)
*H04L 12/751* (2013.01)
*H04L 45/00* (2022.01)
*H04L 45/02* (2022.01)

(52) U.S. Cl.
CPC .............. *H04L 45/22* (2013.01); *H04L 45/02* (2013.01)

(58) Field of Classification Search
CPC ................................. H04L 45/22; H04L 45/02
See application file for complete search history.

(56) References Cited

U.S. PATENT DOCUMENTS

| | | | |
|---|---|---|---|
| 6,262,977 B1 * | 7/2001 | Seaman | H04L 12/2852 370/254 |
| 6,535,490 B1 * | 3/2003 | Jain | H04L 12/462 370/254 |
| 6,657,973 B1 * | 12/2003 | Arima | H04L 12/40065 370/254 |
| 6,697,339 B1 * | 2/2004 | Jain | H04L 12/462 370/256 |
| 7,660,271 B2 | 2/2010 | Pang | |
| 7,876,672 B2 * | 1/2011 | Chao | H04L 45/50 370/218 |
| 8,355,348 B1 | 1/2013 | Miller et al. | |
| 8,411,690 B2 | 4/2013 | Florit et al. | |
| 8,799,444 B2 * | 8/2014 | Wakumoto | H04L 45/26 709/224 |
| 9,385,885 B2 | 7/2016 | Kulkarni et al. | |
| 9,553,736 B2 | 1/2017 | North et al. | |
| 10,700,890 B1 * | 6/2020 | Kalyanaraman | H04L 45/48 |
| 2003/0005149 A1 * | 1/2003 | Haas | H04L 12/1854 709/238 |
| 2003/0161275 A1 * | 8/2003 | Malhotra | H04L 69/40 370/256 |
| 2005/0286413 A1 * | 12/2005 | Wakumoto | H04L 45/22 370/216 |
| 2007/0025275 A1 * | 2/2007 | Tallet | H04L 45/02 370/255 |

(Continued)

OTHER PUBLICATIONS

LAN Switching Configuration Guide, CISCO IOS XE Release 3S, Resilient Ethernet Protocol (REP), 28 Pages.

*Primary Examiner* — Ivan O Latorre
(74) *Attorney, Agent, or Firm* — Patterson + Sherdan, LLP

(57) ABSTRACT

Techniques for extended network configuration conversion and reconfiguration are described. A network controller proceeds through a set of extended network nodes in an extended network and reconfigures ports in at the various nodes from a first configuration to a second configuration while preventing network traffic looping and maintaining data and management traffic connection to the nodes during the reconfiguration.

14 Claims, 12 Drawing Sheets

(56) References Cited

U.S. PATENT DOCUMENTS

| | | | |
|---|---|---|---|
| 2007/0036072 A1* | 2/2007 | Raj | H04L 45/22 370/225 |
| 2008/0049609 A1* | 2/2008 | Chao | H04L 12/66 370/218 |
| 2008/0056137 A1* | 3/2008 | Ravindran | H04L 45/28 370/238 |
| 2008/0095047 A1* | 4/2008 | Skalecki | H04L 41/0668 370/225 |
| 2008/0130491 A1* | 6/2008 | Chao | H04L 45/22 370/225 |
| 2008/0232347 A1* | 9/2008 | Chao | H04L 45/50 370/351 |
| 2009/0168671 A1 | 7/2009 | Holness et al. | |
| 2009/0268609 A1 | 10/2009 | Koch et al. | |
| 2013/0343179 A1* | 12/2013 | Madaiah | H04L 41/0654 370/222 |
| 2015/0215201 A1* | 7/2015 | Nakash | H04L 45/28 370/218 |
| 2015/0281121 A1* | 10/2015 | Fukaya | H04L 47/2458 370/468 |
| 2015/0341256 A1* | 11/2015 | Jia | H04L 45/48 370/228 |
| 2017/0041214 A1* | 2/2017 | Broerman | H04L 12/2858 |
| 2017/0063617 A1* | 3/2017 | Sudharshan | H04L 45/00 |
| 2018/0205596 A1* | 7/2018 | Chu | H04L 41/0659 |
| 2020/0036622 A1* | 1/2020 | Tamizkar | H04L 45/18 |
| 2020/0119974 A1* | 4/2020 | Subramani | H04L 41/0659 |

* cited by examiner

EXTENDED NETWORK NODE PROVISIONING IN SOFTWARE DEFINED ACCESS FABRIC NETWORKS

Embodiments presented in this disclosure generally relate to configuring and connecting devices in extended networks at network fabric edges. More specifically, embodiments disclosed herein relate to reconfiguring extended network nodes from one network configuration to another network configuration without network connection interruption.

BACKGROUND

Extended network devices (extended network nodes) in networks are often connected in extended networks using plug-and-play configurations and other network configurations that allow for the extended network nodes to be connected to a larger network. While these network configurations and protocols allow for the extended networks to be established, they are often not suitable for, or the best configuration for, long term establishment of the network. Reconfiguring established extended networks from a first configuration to a second more resilient configuration requires manual review and input into each extended network node and requires taking down portions of the network to allow for reconfiguration.

BRIEF DESCRIPTION OF THE DRAWINGS

So that the manner in which the above-recited features of the present disclosure can be understood in detail, a more particular description of the disclosure, briefly summarized above, may be had by reference to embodiments, some of which are illustrated in the appended drawings. It is to be noted, however, that the appended drawings illustrate typical embodiments and are therefore not to be considered limiting; other equally effective embodiments are contemplated.

To facilitate understanding, identical reference numerals have been used, where possible, to designate identical elements that are common to the figures. It is contemplated that elements disclosed in one embodiment may be beneficially used in other embodiments without specific recitation.

DESCRIPTION OF EXAMPLE EMBODIMENTS

Overview

Figure 1A:
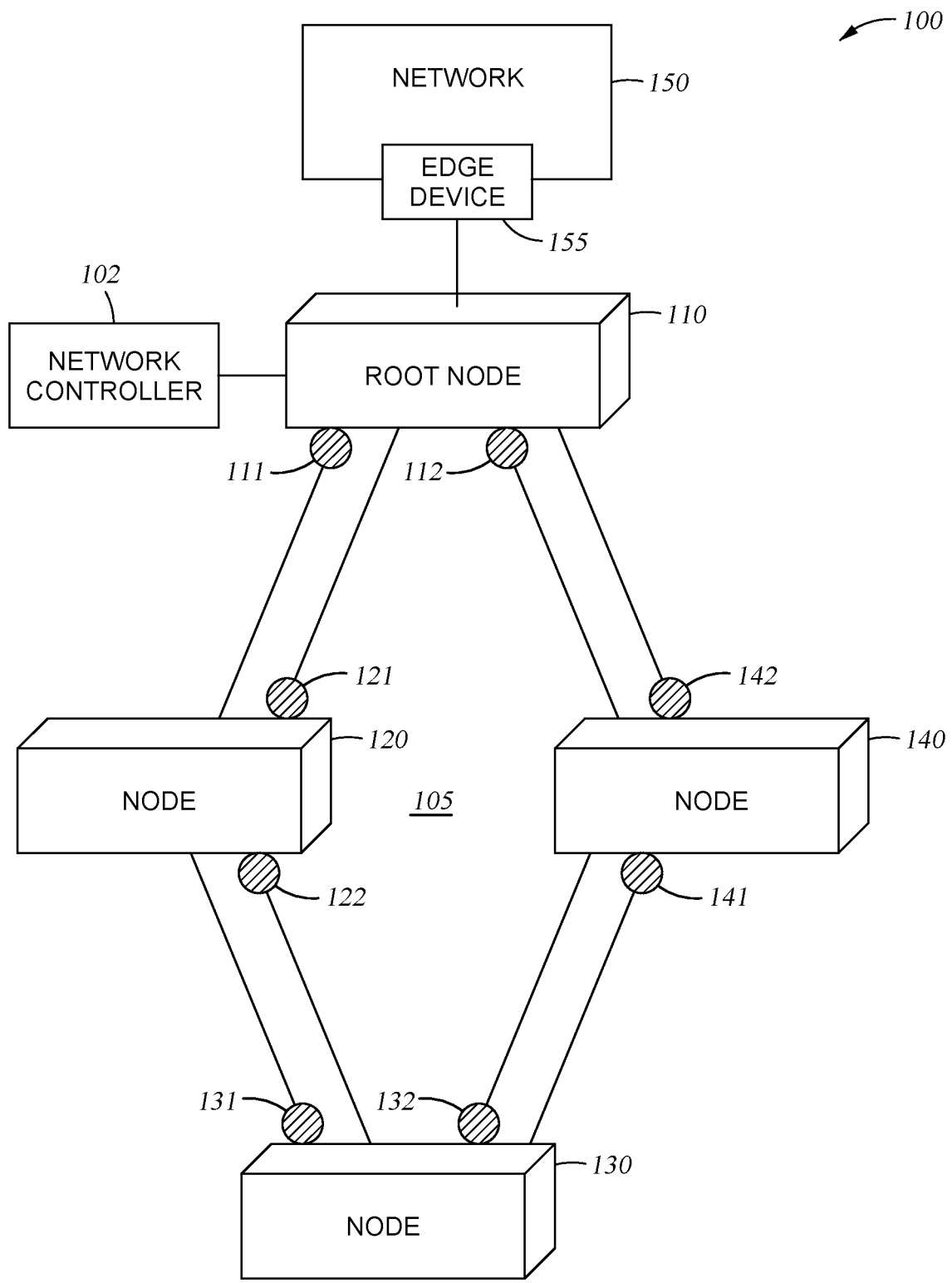
FIG. 1A illustrates an extended network node network, according to one embodiment.

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method including: closing a first traffic path in a first network configuration for a plurality of extended network nodes to cause the plurality of extended network nodes to use a first alternate traffic path for data traffic transmission, configuring a first set of ports in the plurality of extended network nodes to define a second traffic path in a second network configuration for the plurality of extended network nodes, closing the first alternate traffic path to cause the plurality of extended network nodes to use the second traffic path in the second network configuration for the data traffic transmission, and configuring a second set of ports in the plurality of extended network nodes in the first network configuration into the second network configuration. Other embodiments of this aspect include corresponding computer systems, apparatus, and computer programs recorded on one or more computer storage devices, each configured to perform the actions of the methods.

One example embodiment is a system including: a processor; and a memory including instructions which, when executed on the processor, performs an operation. The operation includes: closing a first traffic path in a first network configuration for a plurality of extended network nodes to cause the plurality of extended network nodes to use a first alternate traffic path for data traffic transmission, configuring a first set of ports in the plurality of extended network nodes to define a second traffic path in a second network configuration for the plurality of extended network nodes, closing the first alternate traffic path to cause the plurality of extended network nodes to use the second traffic path in the second network configuration for the data traffic transmission, and configuring a second set of ports in the plurality of extended network nodes in the first network configuration into the second network configuration.

One example embodiment is a computer program product including a non-transitory computer-readable medium program having program instructions embodied therewith, the program instructions executable by a processor to perform an operation. The operation includes: closing a first traffic path in a first network configuration for a plurality of extended network nodes to cause the plurality of extended network nodes to use a first alternate traffic path for data traffic transmission, configuring a first set of ports in the plurality of extended network nodes to define a second traffic path in a second network configuration for the plurality of extended network nodes, closing the first alternate traffic path to cause the plurality of extended network nodes to use the second traffic path in the second network configuration for the data traffic transmission, and configuring a second set of ports in the plurality of extended network nodes in the first network configuration into the second network configuration.

EXAMPLE EMBODIMENTS

Large network fabrics, such as campus wide fabrics, large scale datacenters, enterprise fabrics, etc., provide primary connectivity to core network devices directly connected to the network fabric. In some examples, the large network fabrics also include lower cost and replaceable/interchangeable extended devices connected to extended networks as extended network nodes. These extended devices provide peripheral services to the campus fabrics and may include internet-of-things and other types of devices that are easily installed and easily interchanged and/or replaced in the wider network. These extended devices in the networks are often connected to extended networks, or networks that extended the network access from the core network fabric, using plug-and-play configurations and other network configurations that allow for the extended network nodes to be connected (and disconnected) to a network.

While these network configurations and protocols provide mechanisms for the extended networks to be provisioned and established, the initial network configurations are often not suitable for long term execution of the network. Additionally, configuring/provisioning extended networks and reconfiguring extended networks from a first configuration to a second more resilient configuration requires manual review and input into each extended network node. The reconfiguration also requires taking down portions of the extended network to allow for reconfiguration.

Furthermore, larger network fabrics often include a multitude of different types of device and configurations to which the extended networks need to connect. Edge devices the extended networks connect through can often vary in configuration and type. The varying types and complexities involved with each of possible configurations at both the edge devices in the larger network and the various configurations in the extended network creates challenges for the network providers. These challenges include setting up, provisioning, and configuring the extended networks as well as ensuring a continued reliable connection to the devices connected through the extended networks.

The systems and methods described herein establish and configure an extended network to provide reliable connections for prolonged durations by reconfiguring an extended network from a first configuration used for network set-up to a more resilient second network configuration used for longer durations in the network.

FIG. 1A illustrates a network, network 100, according to one embodiment. The network 100 includes an extended network 105 connected to a network fabric 150 at an edge device 155. The extended network 105 includes a root node 110 that connects to the edge device 155 and the network fabric 150. While shown as an example ring type topology in FIG. 1A, the topology and configuration of the various networks fabrics and extended networks can vary greatly in implementation among the various extended networks and devices connected to the network.

Figure 1B:
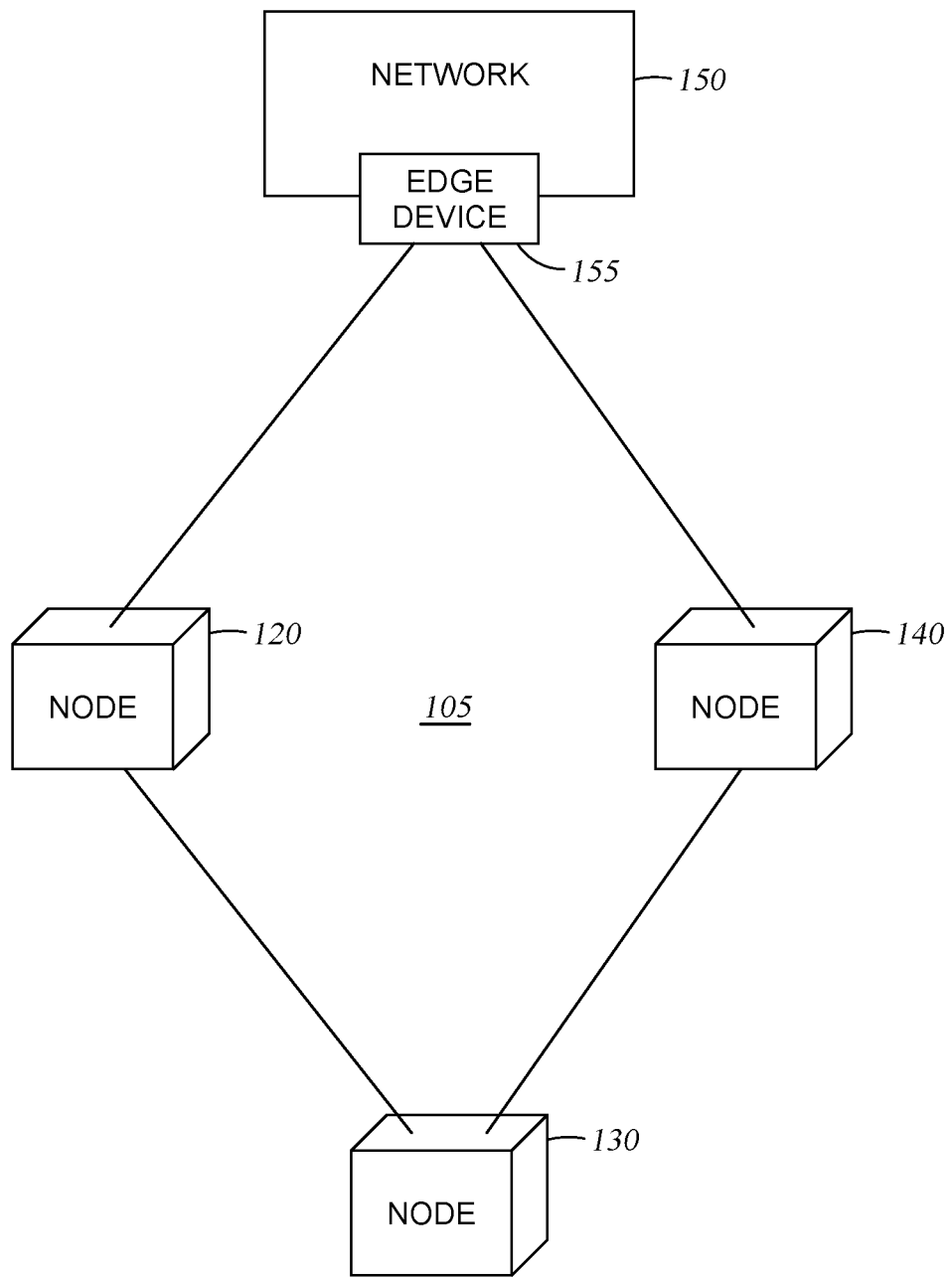
FIG. 1B illustrates an extended network node network with an edge device serving as a root node, according to one embodiment.
Figure 1C:
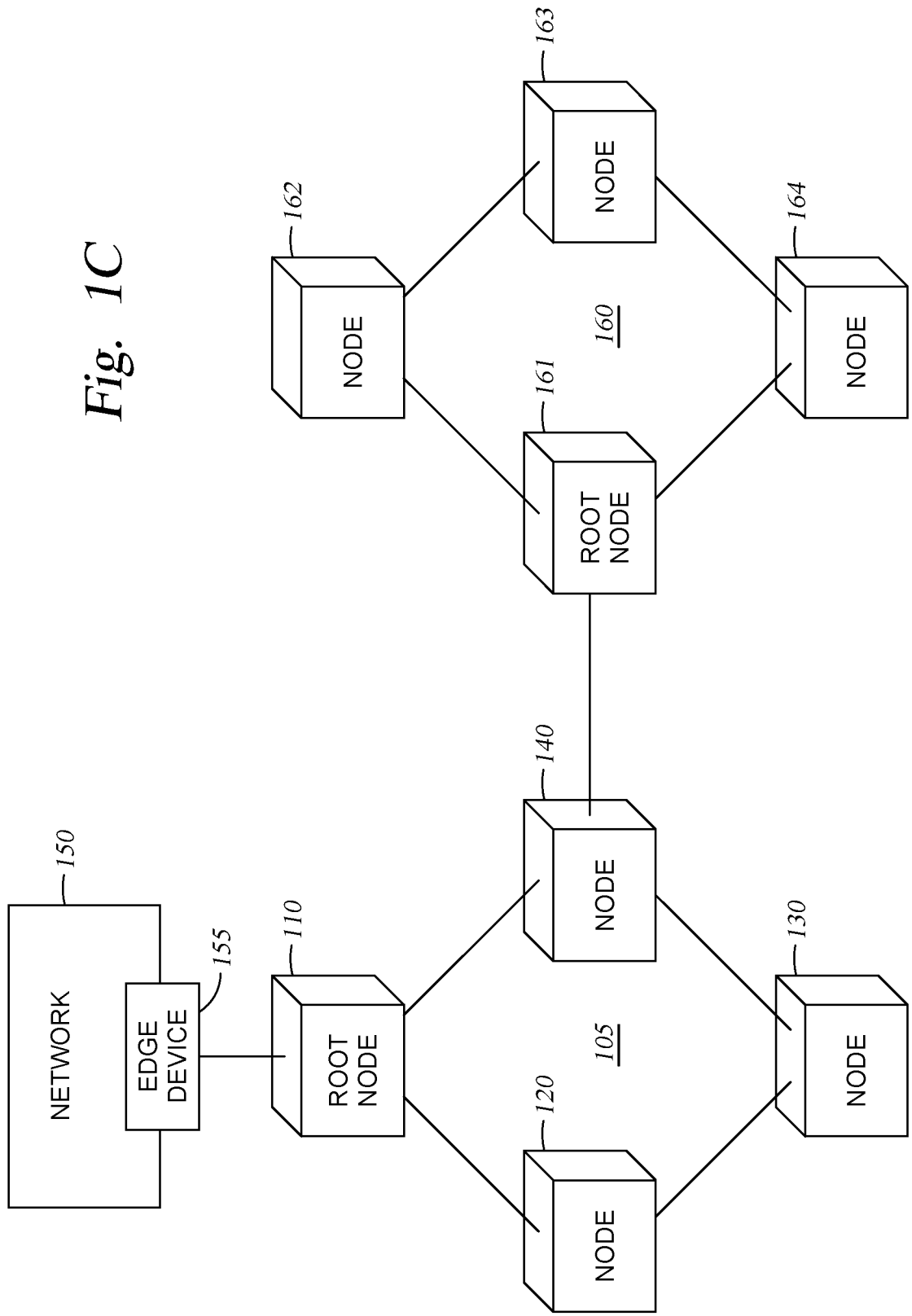
FIG. 1C illustrates multiple root nodes in an extended network node network, according to one embodiment.

For example, as shown in FIG. 1A, the root node 110 is an extended network node in the extended network 105 in communication with the fabric network via the fabric edge device 155. The fabric edge device 155 may include an edge router, and/or a virtual fabric edge device in the network fabric 150. In another example shown in FIG. 1B, the edge device 155 (either as an edge router or a virtual edge router) serves as the root node for the extended network 105 and is directly connected to the non-root nodes extended network 105 (i.e., the fabric edge device 155 in the network fabric 150 serves as the root node for the extended network 105). In some examples, such as shown in FIG. 1C, a network 160 is an adjacent extended network with a root node 161 for the nodes 162-164. The root node 161 is connected to the node 140 and the network 105. In some examples, the networks 105 and 160 are established and reconfigured in substantially similar methods as described herein.

Referring back to FIG. 1A, the network 100 may include multiple networks, such as the network fabric 150, and multiple extended networks, such as the network 105, as part of a larger total campus fabric network. The topology and configuration of the various networks and extended networks can vary greatly among the various extended networks and devices connected to the network. The varying types and complexities involved with each of possible configurations creates challenges for the network providers both in setting up the extended networks and in ensuring continued reliable connection to the networks. The systems and methods described herein provide for efficient configuration and reconfiguration for the various topologies shown in FIGS. 1A-C among others.

In some examples, the network 105 is an extended network node network for various nodes including the nodes 120, 130, and 140 (and the root node 110 when the root node is an extended network node and/or device). The network 105 has a topology which may include a ring topology as shown in FIG. 1A, among other typical alternate topologies for extended networks. In some examples, the extended network nodes (e.g., root node 110 and nodes 120, 130, and 140) are interchangeable plug-and-play (PNP) devices that can be added/removed/replaced by a customer of the network 100 and/or a network provider of the network 100. For example, the extended network nodes may include internet-of-things (IoT) devices connected to the network 100 via the extended network 105. Customers of the network provider of the network 100 and/or the network provider desire to add and/or replace these extended network nodes on ad-hoc basis dynamically in the network 100. In order to provide consistent software-defined (SD) access networks and to ensure the extended network nodes are connected, the topology of the extended network node networks such as the network 105 and network fabric 150 are discovered, learned, and updated, at the same time edge devices, such as the fabric edge device 155, are provisioned and provide network 105 with access to the network fabric 150 (e.g., more edge devices and networks 105 are provisioned and established as more extended network nodes are added to extended networks such as the network 105).

In some examples, the extended network nodes include device (node) specific network configurations and PNP configurations installed on the nodes which enable on boarding of a next connected extended network node in ring. For example, the node 130, prior to connection to the network 105, includes network configurations and PNP configurations in order to join the network 105 and connect to the nodes 120 and 140.

In some examples, the network 105 and a corresponding associated network graph representing the network 105 are built and configured by a network controller 102 in communication with the root node 110 and other extended network nodes. In some examples, the network 105 is built based on a combination of extended network node addition events (e.g., when a node is available for connection to the network 105 and indicates that connection to nearby devices, etc.), port information (e.g., available ports and configuration on extended network nodes), and network link information in network inventory tables at the extended network nodes and the network controller 102.

In some examples, due to limited information available at the extended network nodes and the network controller 102, the network controller first builds the network 105 and associated network graph with partial/limited information about the extended network nodes in the network 105 and later completes the remaining links in the network 105 and the associated network graph based on other network connection events that can potentially complete the ring/graph.

In some examples, the extended network nodes 120-140 are on-boarded and connected to the network 105 by the network controller 102 by first configuring the root node 110 with PNP startup configurations and network connection configurations (macro/auto configurations) for onboarding of extended network nodes (e.g., the nodes 120-140). In some examples, the network controller 102 configures the root node 110 so that various components such as associated ports of the root node 110 are in a first network configuration protocol such as Spanning Tree Protocol (STP) root for the extended networks. For example root ports, such as ports 111 and 112, at the root node 110 are initially configured as STP root ports during initial configuration of the root node 110.

During onboarding of the extended network nodes, the nodes 120 and 140 are reloaded and configured to enable the connection of the nodes to the root node 110. In some examples, a combination of configured PNP and macros configurations on the root node 110 configure connecting/connected ports between the root node 110 and extended network nodes (e.g., the nodes 120 and 140) as trunk ports (indicating a trunk link and/or an aggregation of links between the connected nodes). For example, the root ports, ports 111 and 112 along with ports 121 and 142 on the nodes 120 and 140, respectively are configured as trunk ports indicating connection to the root node 110.

Once the connection to the network 105 is completed for extended network nodes 120 and 140. The network controller 102 further configures/updates the nodes 120 and 140 with device specific macro and PNP configurations which enables onboarding of adjacent nodes connected in the network 105 to form a complete network topology such as a ring topology.

As part of provisioning and establishing the network 105, the network controller 102 also builds the associated network graph containing edge/root nodes and extended network nodes. In some examples, the network controller 102 builds the network graph using network and device information available as part of PNP device information transmitted from the extended network nodes in the extended network. For example, the information includes medium access control (MAC) address information of remote ports at the extended network nodes. The network controller 102 compares the MAC address information with available information stored in the inventory tables at the network controller 102. The network controller 102 also creates adjacency information for edge and extended network nodes when the MAC address information is available in the inventory tables at the network controller 102.

In some examples, during the formation and configuration of the network 105 and depending on the location of extended network node in the network 105 (e.g., the position in the ring network) some extended network node information may not be available at the network controller 102 when an extended network node is first added to the network. The missing information may also be added to the network graph as other extended network nodes are added and/or when the information becomes available to the network controller 102.

The node 130 may be added to the network 105 in a similar manner as described above for nodes 120 and 140. For example, when the nodes 120 and 140 are provisioned and configured by the network controller 102, macro/auto-configurations as well as PNP startup configuration for connecting the node 130 to the network 105 are stored on the nodes. When node 130 is added to the network graph, some information for both 120 and 140 may not be available in the associated network graph at the network controller 102. For example, node 130 can be added through device macros configured on node 120 and node 140, even in the event that information for one of the remote nodes (e.g., node 120, node 140) is not available in inventory tables of the network controller 102 at the time of addition of node 120. The network controller 102 updates the network graph using partial/limited information and adds the complete information to the graph for the nodes in the graph when the information becomes available.

At every step of provisioning of the network 105 and building of the associated network graph, the network controller 102 can check for completion of the network 105 topology (e.g., completion of a network ring, etc.). In some examples, the network topology is determined to be completed when the network controller detects a loop in the connected nodes, indicating the completion of the topology (e.g., completion of the ring).

In some examples, after establishing the network 105, the network 105 and the extended network nodes are configured in a first network configuration such as STP. For example, as shown in the FIG. 1A, each of the ports in the root node 110 and the nodes 120-140 (including ports 111, 112, 121, 122, 131, 132, 141, and 142) are in a first configuration (e.g., STP). In some examples, the first network configuration is useful for configuring the network, but a different or second network configuration should be used after the network 105 is established for better network performance.

The conversion of the network 105 from a first network configuration to a second network configuration presents several challenges. First, a data traffic channel and/or data link layer (layer 2) traffic for the network 105 may not be separate from a network management channel in the second network configuration. Thus, network management traffic from the network controller 102 sent through the network 105 in the second network configuration can affect the data channel of the network 105. This shared data/management channel can break the reachability and/or connection to the extended network node during configuration or reconfiguration into the second network configuration.

Moreover, network management traffic from the network controller 102 should continue to flow during reconfiguration including when an incomplete ring is formed in the network topology, thus the network 105 cannot be reconfigured all at once. The methods and systems described in FIGS. 3A-3F illustrate the process to reconfigure the network 105 from the first network configuration to a second network configuration, while maintaining the viability of the network 105 and avoiding looping traffic and/or dropped network connections at the extended network nodes.

Figure 2A:
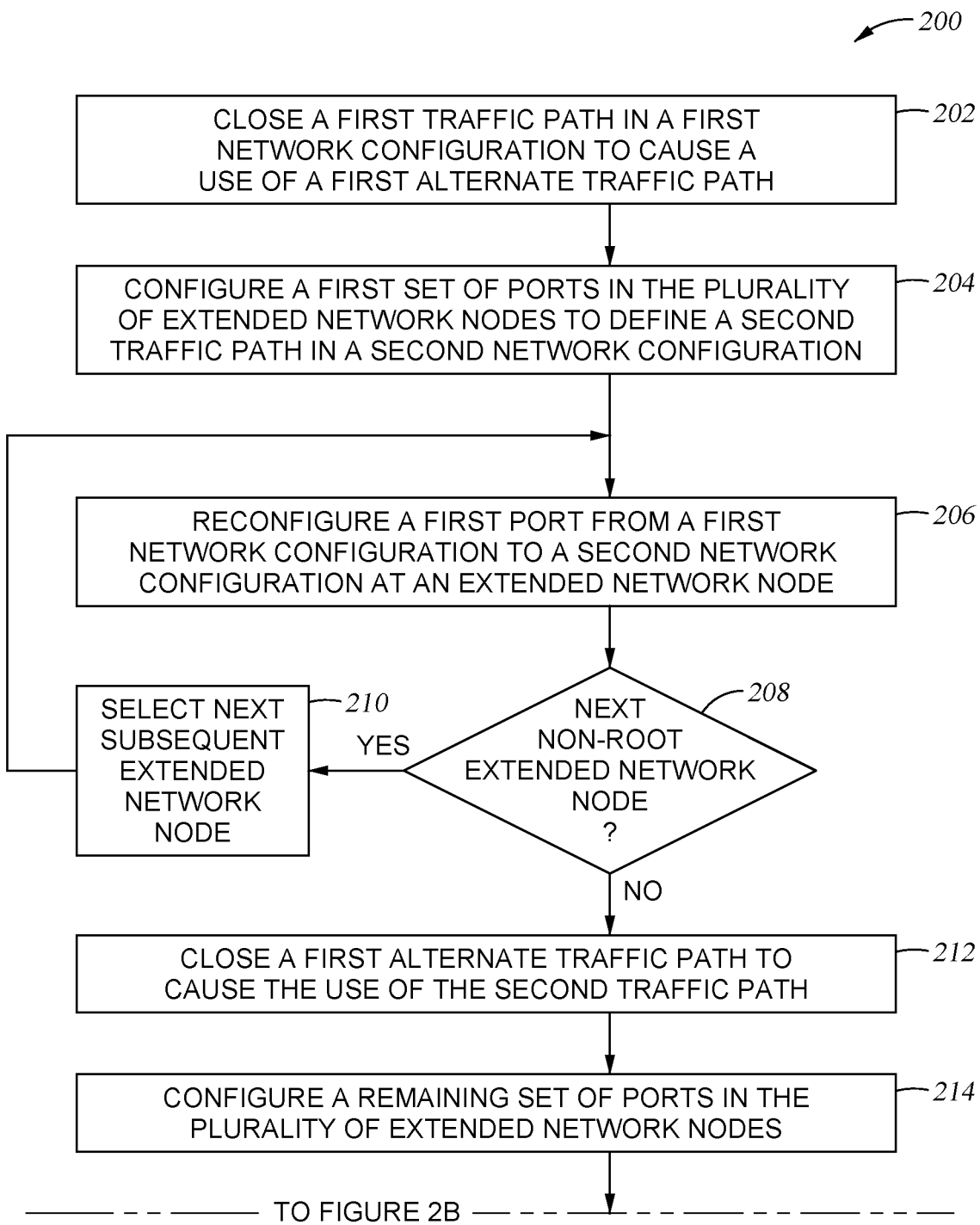
FIGS. 2A-B are a method for network reconfiguration for extended network nodes, according to one embodiment.
Figure 2B:
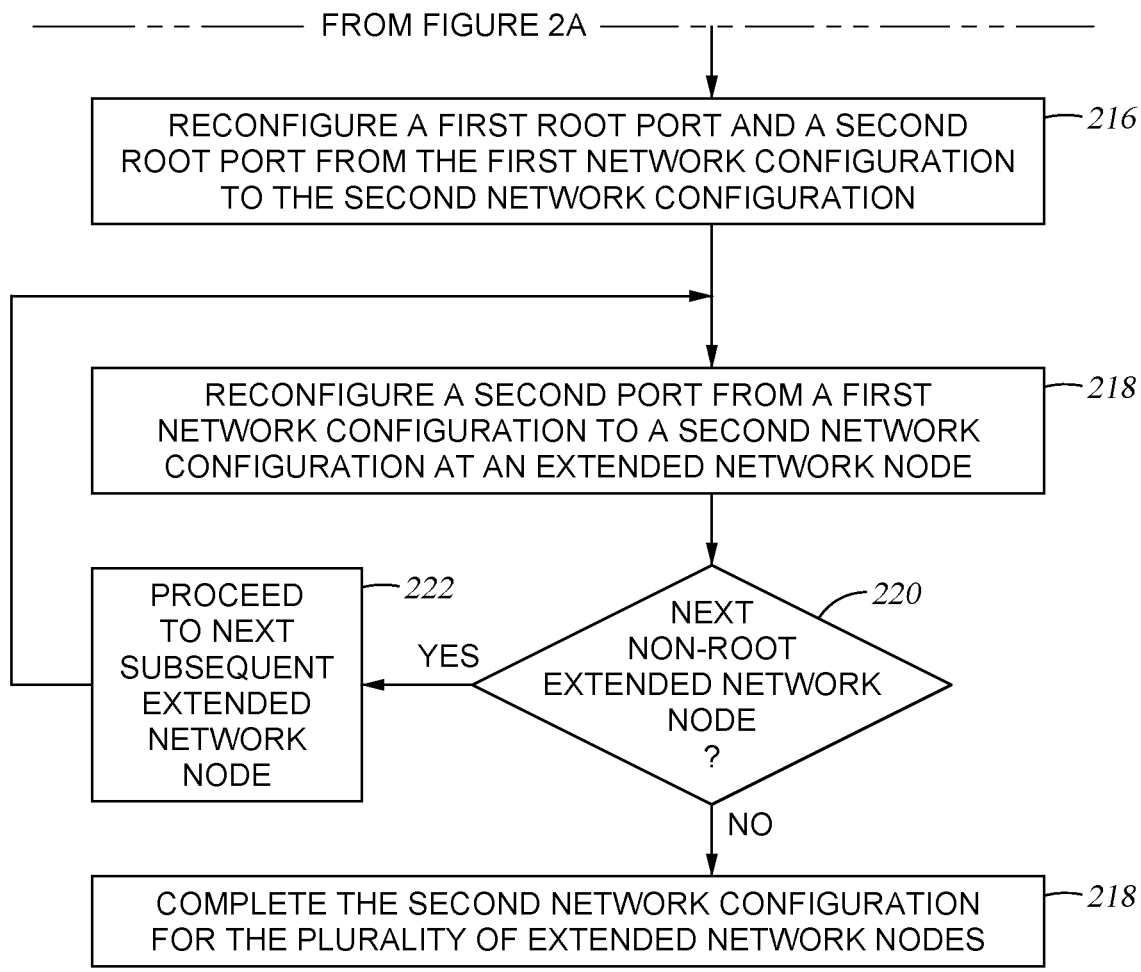

FIGS. 2A-B are a method 200 for network reconfiguration for extended network nodes, according to one embodiment. For clarity, the blocks in the method 200 are discussed in parallel with FIG. 3A-3E. For example, blocks 202-204 correspond to FIG. 3A. As shown in FIG. 1A, each of the ports 111, 112, 121, 122, 131, 132, 141, and 142 and thus the network 105 are in the first network configuration (e.g., STP) in the Data Link Layer (layer 2) network. While the first configuration allows for PNP connection and network building, other configurations such as a second configuration (e.g., a resilient protocol etc.) provide more efficient ways to handle network control, link failures, network changes, and improved convergence time during regular functioning of the network 105. In some examples, the network controller 102 verifies connectivity to all of the connected extended network nodes in the network 105 prior to reconfiguration. For example, the network controller 102 pings the root node 110 and the nodes 120-140 to ensure connectivity in the first network configuration.

Method 200 begins at block 202 where the network controller closes a first traffic path in a first network configuration for a plurality of extended network nodes to cause the plurality of extended network nodes to use a first alternate traffic path for data traffic transmission. In some examples, closing the first traffic path includes closing a first root port for the first traffic path at a root node, where the plurality of extended network nodes use the first alternate traffic path via a second root port at the root node.

Figure 3A:
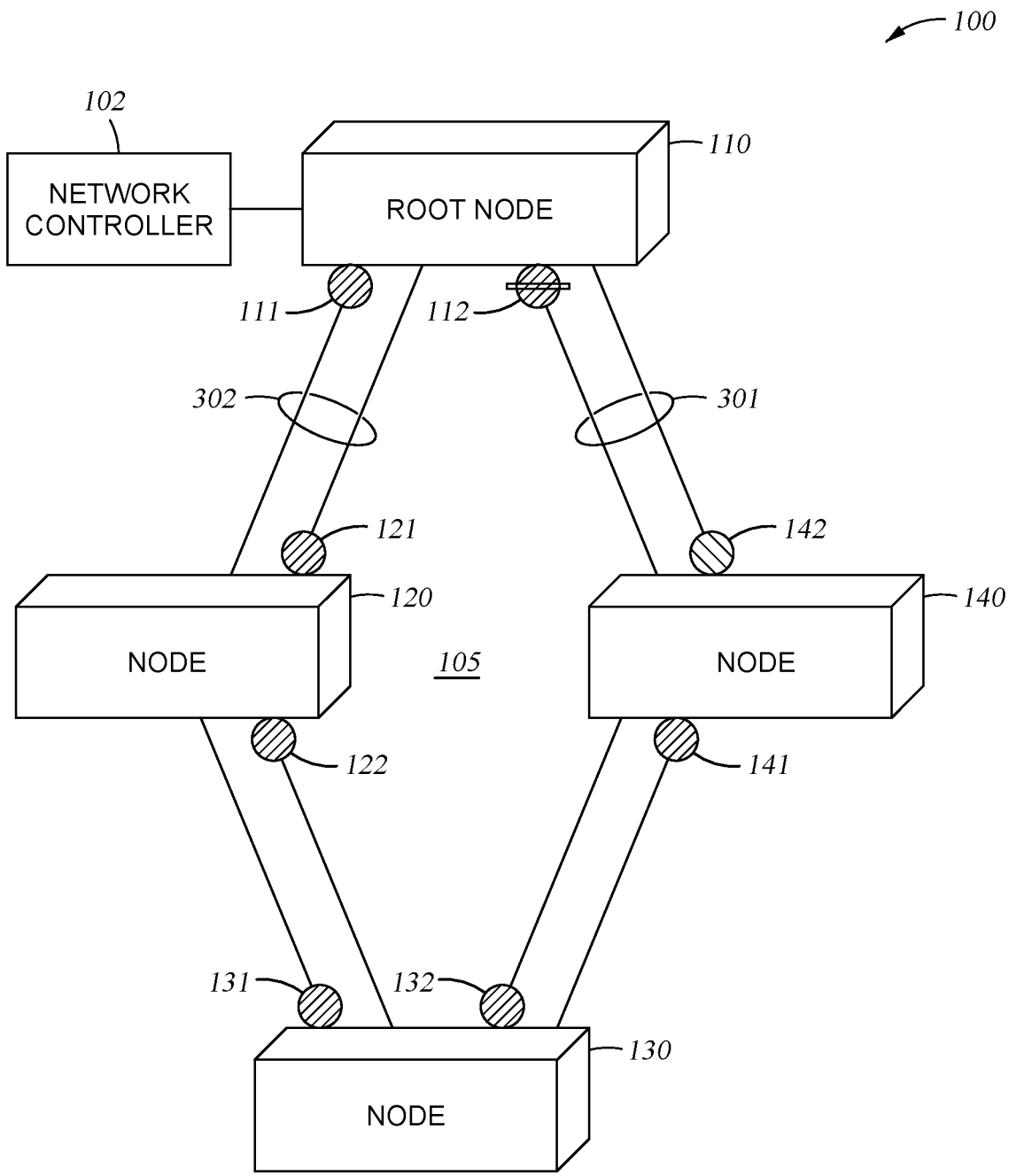
FIGS. 3A-F illustrate steps for reconfiguring an extended network node network, according to embodiments.

For example, as shown in FIG. 3A, the network controller 102 closes a first traffic path in a first network configuration. For example, the network controller 102 closes, blocks, or otherwise stops the port 112 from sending and/or receiving network traffic in the first network configuration and thus the first traffic path 301 is closed between the root node 110 and the node 140. The closure of the first traffic path 301 causes the network nodes including the root node 110 and the nodes 120-140 to use a first alternate traffic path 302 via the port 111 for data traffic transmission from the network 105 and management traffic transmission from the network controller 102. In some examples, the closure of the port 112 and the use of the first alternate traffic path 302 prevents loops from forming in the network 105 during the conversion of the network to the second network configuration. In some examples, after closing the first traffic path 301, the network controller 102 also clears network configuration information at the root node 110 such as aged MAC address information. The clearing of the aged MAC addresses at the root node 110 also causes the MAC address and associated information to be updated at the nodes 120-140 in response to new information at the root node 110.

The network controller 102 also reconfigures a first port from the first network configuration to the second network configuration at a first extended network node proximate to the root node 110. For example, the network controller 102 reconfigures the port 142 from the first configuration to the second configuration.

For example, at block 204, the network controller 102 configures a first set of ports in the plurality of extended network nodes to define a second traffic path in a second network configuration for the plurality of extended network nodes. In some examples, configuring the first set of ports includes configuring a first port at each of the extended network nodes in the network 105. In some examples, configuring the first set of ports is an iterative process that begins at an extended network node that is first hop proximate and/or connected directly to the root node 110 at the closed first traffic path 301. In a ring topology such as shown in FIG. 3A, the first hop proximate node is node 140. For example, the configuration process for the first set of ports begins at the node 140 as described in blocks 206-210.

Figure 3B:
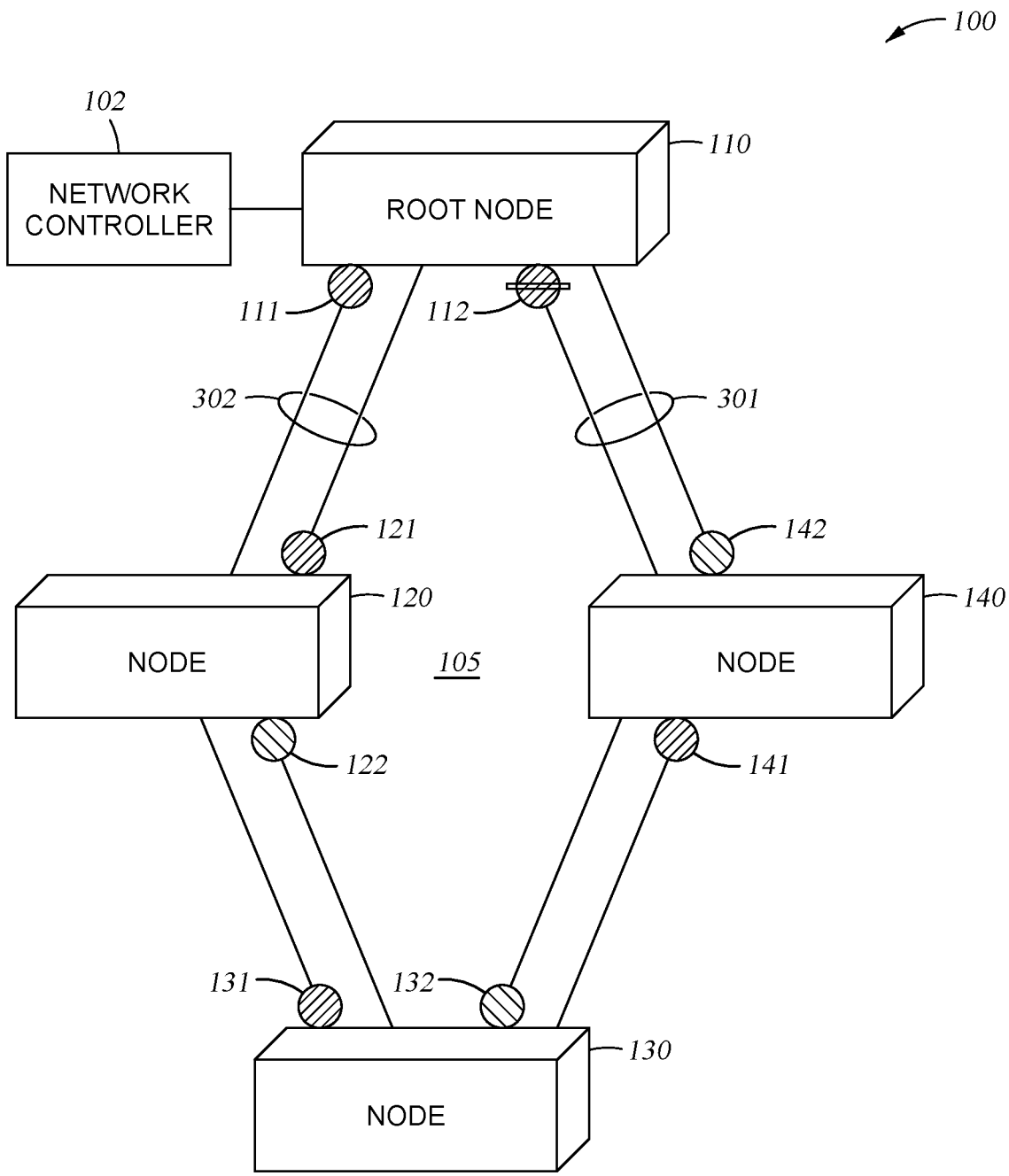

At block 206 and as shown in FIG. 3B, the network controller 102 reconfigures a first port from the first network configuration to the second network configuration. The first port, port 142, in the first set of ports (e.g., the ports 142, 132, and 122) is at the first extended network node, node 140, which is first hop proximate to the root node 110. After, the first port at the network node, node 140, is reconfigured to the second network configuration. The network controller 102 proceeds to reconfigure each subsequent port in a next network node as shown in FIG. 3B. For example, the network controller 102 reconfigures the port 132 from the first network configuration to the second network configuration and reconfigures the port 122 from the first network configuration to the second network configuration. The reconfiguration of the first set of ports 142, 132, and 122 defines a second traffic path 305 in the second network configuration in the network 105. Method 200 proceeds to block 208, where the network controller 102 determines whether there is a next non-root extended network node in the network topology. For example, in the ring topology of network 105, the network controller 102 determines if a next subsequent extended network node is connected to the node 140. In this example, node 130 is connected to the network node, node 140, and method 200 proceeds back to block 210 where the network controller 102 selects the next subsequent extended network node, node 130, and reconfigures the port 132 from the first network configuration to the second network configuration at block 206.

Returning back to block 208, the network controller 102 determines if a next subsequent extended network node is connected to the node 130. In this case, method 200 proceeds back to block 210 where the network controller 102 selects the next subsequent extended network node, node 120, and method 200 proceeds back to block 208 where the network controller reconfigures the port 122 from the first network configuration to the second network configuration. At block 208, the network controller 102 determines if a next subsequent extended network node is connected to the node 120. In this instance, the node 120 is connected to the root node 110 and method 200 proceeds to block 212.

Figure 3C:
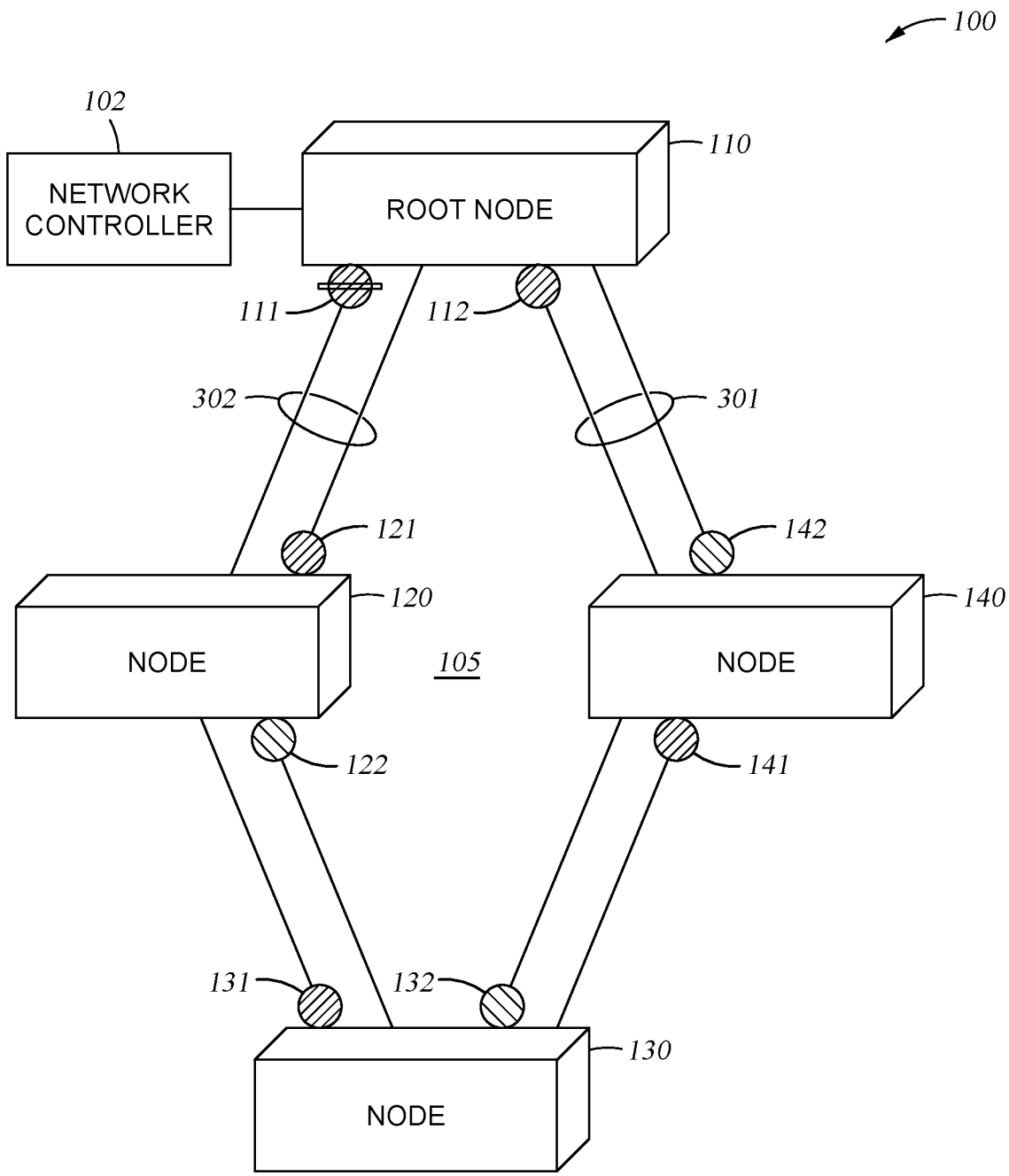
Figure 3D:
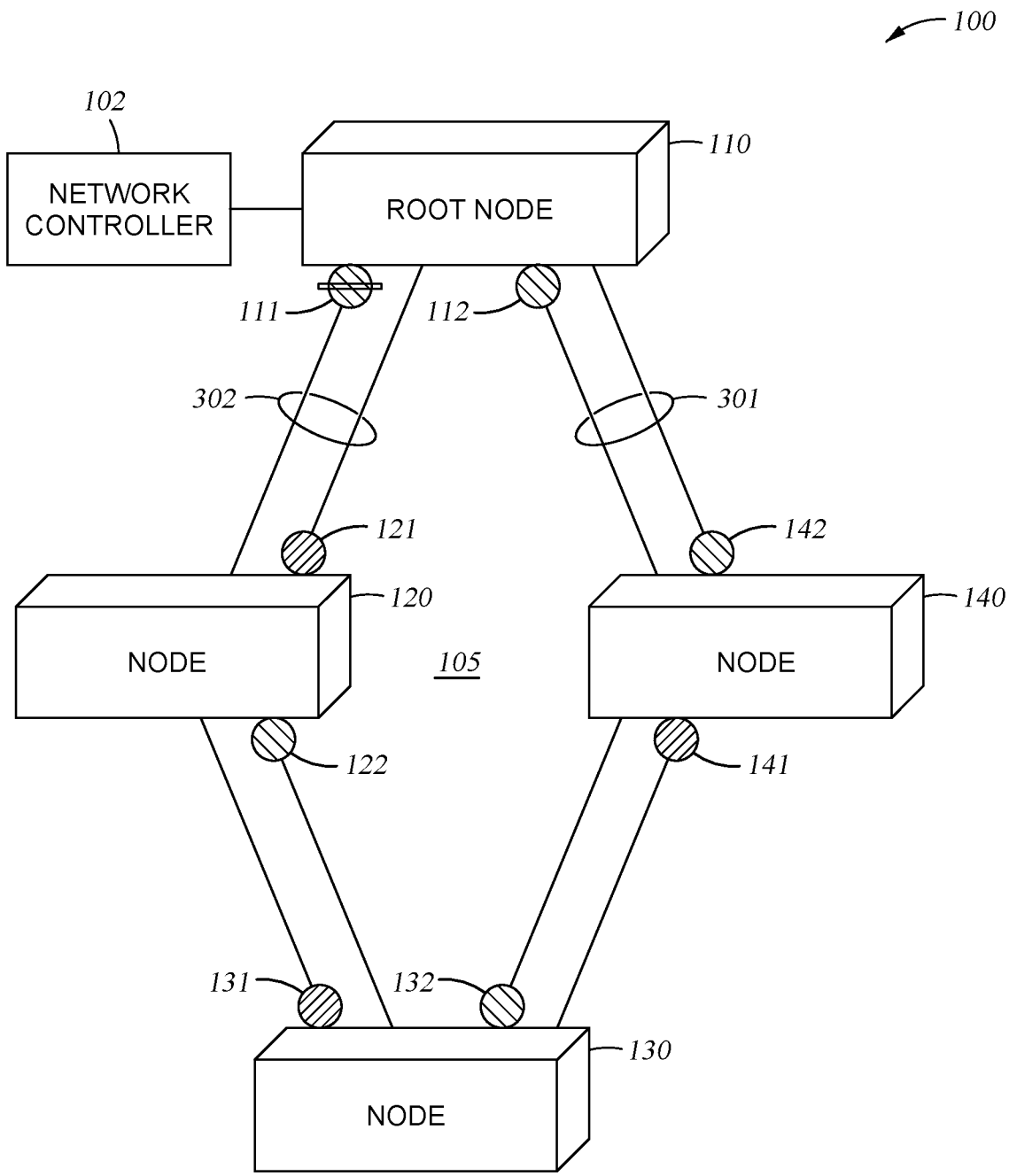
Figure 3E:
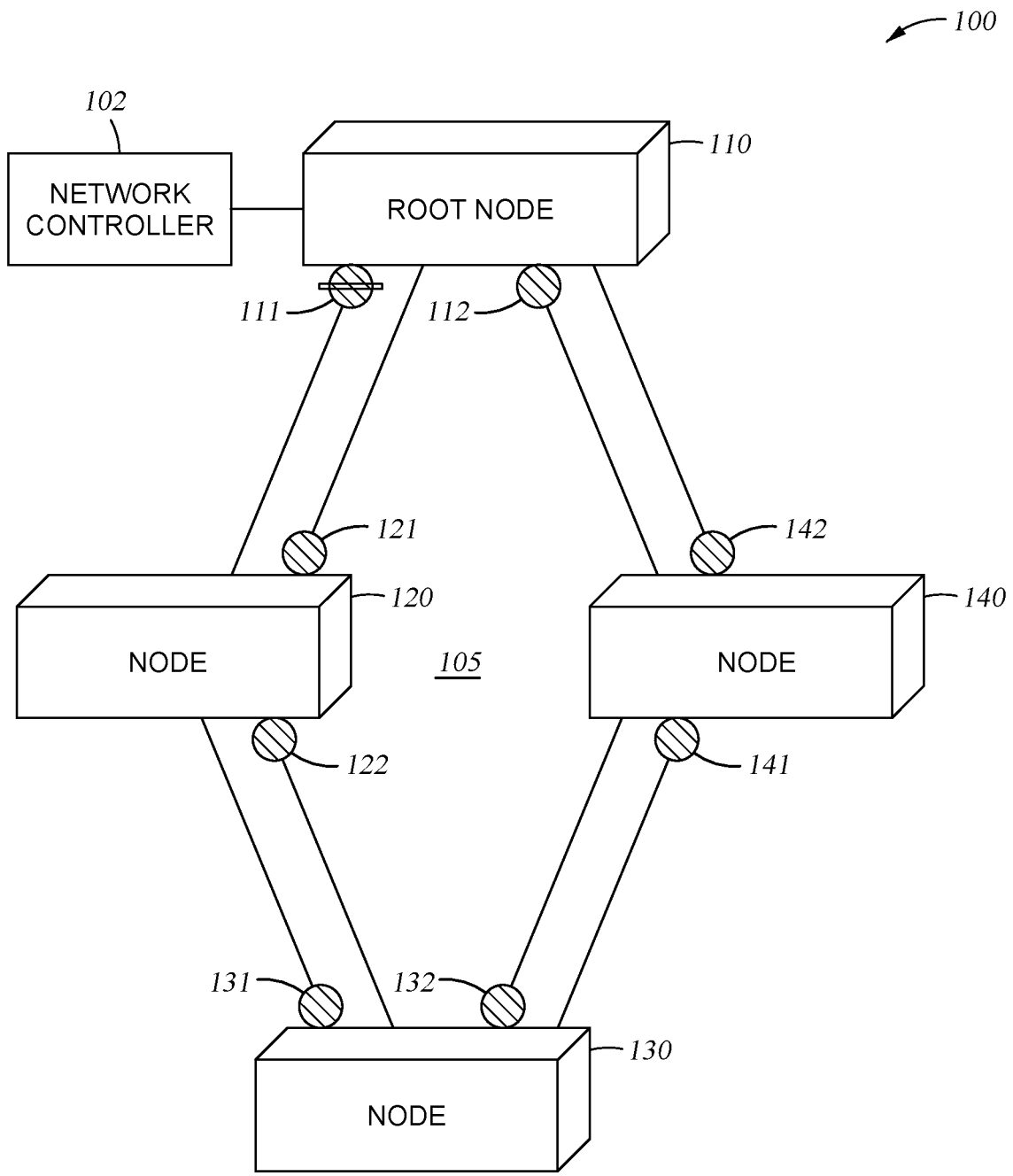
Figure 3F:
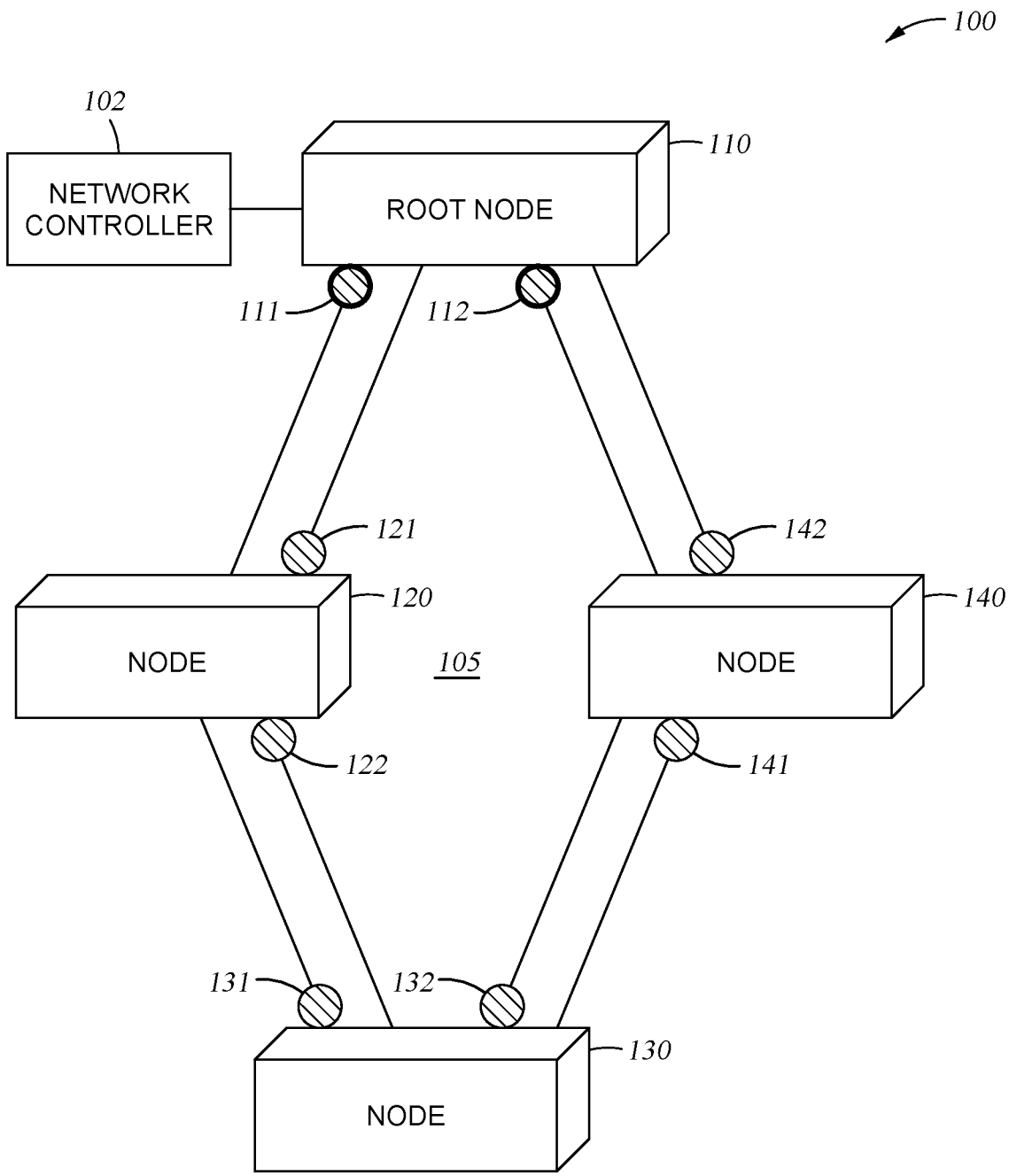

At block 212 and as shown in FIG. 3C, the network controller 102 closes the first alternate traffic path to cause the plurality of extended network nodes to use the second traffic path in the second network configuration for the data traffic transmission. For example in FIG. 3C, the network controller closes the port 111 and opens the port 112. At this point in the conversion/reconfiguration, traffic paths for both the first and second network configurations are available via the ports 112 and 142. In some examples, at this stage the network controller 102 again clears network configuration information at the root node 110 such as aged MAC address information. The clearing of the aged MAC addresses at the root node 110 also causes the MAC address and associated information to be updated at the nodes 120-140 in response to new information at the root node 110.

In some examples, the network controller 102 closes the second root port, port 111, at the root node 110 for the first alternate traffic path, 202 as shown in FIG. 3C at the root node 110 and opens the first root port, port 112, for the first traffic path 301 at the root node 110. This provides the network 105 a viable traffic path via the root node during the reconfiguration, without causing loops in the network 105.

At block 214, the network controller 102 configures a remaining or second set of ports in the plurality of extended network nodes in the first network configuration into the second network configuration. In some examples, the second set includes ports at the root node along with ports at the extended network nodes.

For example, at block 216, the network controller 102 reconfigures the first root port and the second root port from the first network configuration to the second network configuration. For example, in FIG. 3D, the network controller 102 reconfigures the first root port and the second root port from the first network configuration to the second network configuration. For example, the network controller reconfigures the currently closed port, port 111 and the port 112 from the first network configuration to the second network configuration.

At block at block 218, the network controller 102 reconfigures a second port from the first network configuration to the second network configuration. For example, in FIG. 3E, the network controller 102 reconfigures the port 141 at the node 140 from the first network configuration to the second network configuration. For example, the second port at node 140, port 141 is at the first extended network node, node 140, which is first hop proximate to the root node 110.

The network controller 102 also reconfigures, at each next subsequent extended network node of the plurality of extended network nodes, a second port from the first network configuration to the second network configuration. For example, the network controller reconfigures the ports 131 and 121 from the first network configuration to the second network configuration. For example, after, the second port at the network node, node 140, is reconfigured to the second network configuration, method 200 proceeds to block 220, where the network controller 102 determines whether there is a next non-root extended network node in the network topology. For example, in the ring topology of network 105, the network controller 102 determines if a next subsequent extended network node is connected to the node 140. In this example, node 130 is connected to the network node, node 140, and method 200 proceeds to block 222 where the network controller 102 selects the next subsequent extended network node, node 130, and reconfigures the port 131 from the first network configuration to the second network configuration at block 218.

Returning back to block 220, the network controller 102 determines if a next subsequent extended network node is connected to the node 130. In this case, method 200 proceeds back to block 222 where the network controller 102 selects the next subsequent extended network node, node 120, and method 200 proceeds back to block 218 where the network controller reconfigures the port 121 from the first network configuration to the second network configuration. At block 220, the network controller 102 determines if a next subsequent extended network node is connected to the node 120. In this instance, the node 120 is connected to the root node 110 and method 200 proceeds to block 224.

At block 224, the network controller 102 completes the second network configuration for the plurality of extended network nodes. In some examples, the second network configuration is completed by opening the second root port at the root node. For example, in FIG. 3F, the network controller 102 opens the second root port at the root node to complete the second network configuration for the plurality of extended network nodes. The network controller 102 also verifies connectivity to the plurality of extended network nodes in the second network configuration. For example, the network controller opens the port 111 at the root node 110 allowing for full connectivity of the network 105 in the second network configuration. In some examples, the network controller 102 also configures the ports 111 and 112 as edge and/or root ports indicating to the nodes 120-140 in the second network configuration that the root node 110 is the root/edge node for the network 105. In some examples, the network controller 102 also verifies the connectivity of the network 105 by pinging the nodes in the network 105 including the root node 110 and the nodes 120-140. In some examples, once the network controller 102 has verified the connectivity of the network 105, the network has been successfully converted and/or reconfigured from the first network configuration to the second network configuration.

Figure 4:
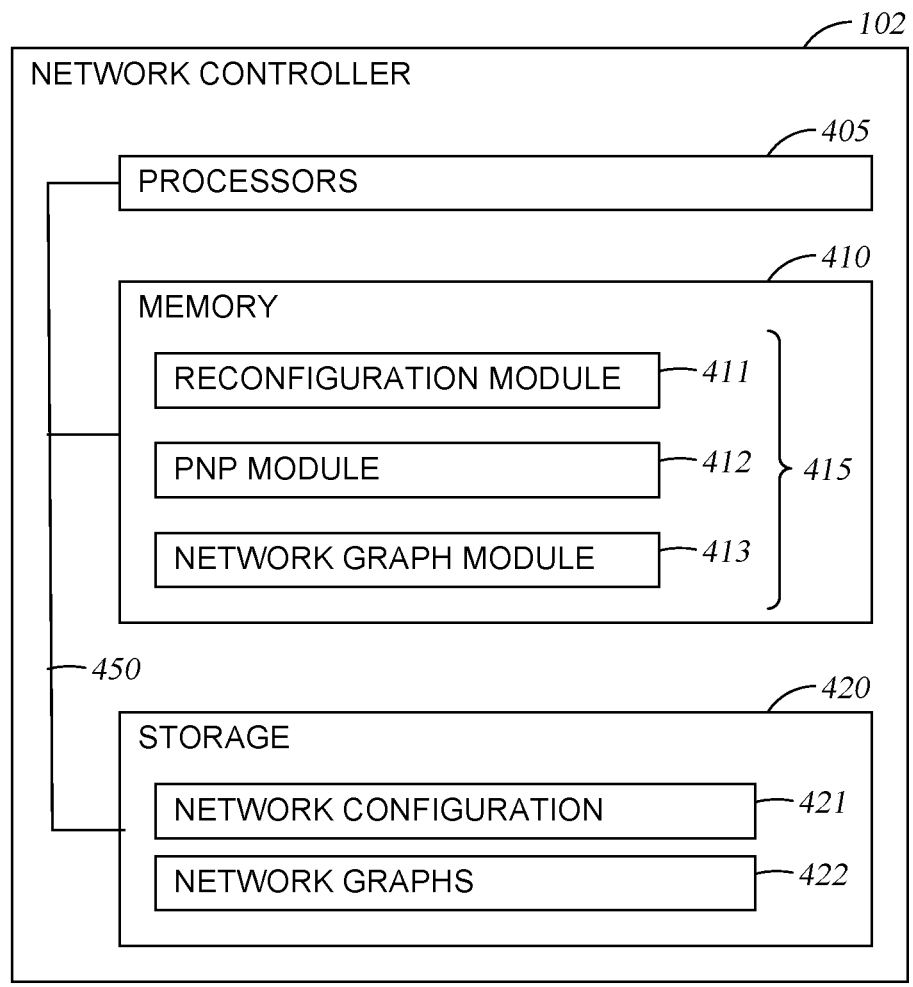
FIG. 4 is a block diagram of a network controller in a network, according to one embodiment.

FIG. 4 is a block diagram of a network controller 102 in a network, according to one embodiment. As shown in FIG. 4, the network controller 102 may include a controller embodied in server/computer/router, and or other virtual functions etc., provisions and configures the network 105 as described in FIGS. 1A-C and FIGS. 3A-F and performs the methods described in relation to FIGS. 2A-B. The components of network controller 102 may include, but are not limited to, one or more processing units or processors 405, a system memory 410, a storage system 420, a bus 450 that couples various system components including the system memory 410 and storage system 420 to processors 405 along with a network interface and input/output interface (not shown). In some embodiments, network controller 102 is distributed and includes a plurality of discrete computing devices that are connected through wired or wireless networking.

System memory 410 may include a plurality of program modules 415 for performing various functions related to connecting a user device to a protected network, described herein. The program modules 415 generally include program code that is executable by one or more of the processors 405. As shown, the program modules 415 include a reconfiguration module 411, a PNP module 412, and a network graph module 413. In some examples, the program modules 415 may be distributed and/or cloud based applications/modules. Additionally, storage system 420 may include media for storing network configurations 421 (including PNP configurations, the first network configuration and the second network configuration) and network graphs 422 generated by the network controller 102 and the network graph module 413. The information stored in storage system 420 may be updated and accessed by the program modules 415 to perform the methods and functions described herein.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium is any tangible medium that can contain, or store a program for use by or in connection with an instruction execution system, apparatus or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products according to embodiments presented in this disclosure. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Embodiments of the invention may be provided to end users through a cloud computing infrastructure. Cloud computing generally refers to the provision of scalable computing resources as a service over a network. More formally, cloud computing may be defined as a computing capability that provides an abstraction between the computing resource and its underlying technical architecture (e.g., servers, storage, networks), enabling convenient, on-demand network access to a shared pool of configurable computing resources that can be rapidly provisioned and released with minimal management effort or service provider interaction. Thus, cloud computing allows a user to access virtual computing resources (e.g., storage, data, applications, and even complete virtualized computing systems) in "the cloud," without regard for the underlying physical systems (or locations of those systems) used to provide the computing resources.

Typically, cloud computing resources are provided to a user on a pay-per-use basis, where users are charged only for the computing resources actually used (e.g. an amount of storage space consumed by a user or a number of virtualized systems instantiated by the user). A user can access any of the resources that reside in the cloud at any time, and from anywhere across the Internet.

The flowchart and block diagrams in the FIGS. illustrate the architecture, functionality and operation of possible implementations of systems, methods and computer program products according to various embodiments. In this regard, each block in the flowchart or block diagrams may represent a module, segment or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

In view of the foregoing, the scope of the present disclosure is determined by the claims that follow.

We claim:

1. A method comprising:
closing a first traffic path in a first network configuration for a plurality of extended network nodes by closing a first root port for the first traffic path at a root node for the plurality of extended network nodes, wherein the plurality of extended network nodes use a first alternate traffic path for data traffic transmission, wherein the plurality of extended network nodes use the first alternate traffic path via a second root port at the root node;
configuring a first set of ports in the plurality of extended network nodes to define a second traffic path in a second network configuration for the plurality of extended network nodes by:
  reconfiguring a first port from the first network configuration to the second network configuration, wherein the first port is at first extended network node of the plurality of extended network nodes, wherein the first extended network node is first hop proximate to the root node; and
  reconfiguring at each next subsequent extended network node of the plurality of extended network nodes a first port from the first network configuration to the second network configuration;
closing the first alternate traffic path to cause the plurality of extended network nodes to use the second traffic path in the second network configuration for the data traffic transmission; and
configuring a second set of ports in the plurality of extended network nodes in the first network configuration into the second network configuration.

2. The method of claim 1, wherein closing the first alternate traffic path comprises:
closing the second root port at the root node for the first alternate traffic path at the root node for the plurality of extended network nodes; and
opening the first root port for the first traffic path at the root node.

3. The method of claim 2, wherein configuring the second set of ports in the plurality of extended network nodes in the first network configuration into the second network configuration comprises:
reconfiguring the first root port and the second root port from the first network configuration to the second network configuration;

reconfiguring a second port from the first network configuration to the second network configuration, wherein the second port is at the first extended network node of the plurality of extended network nodes; and reconfiguring at each next subsequent extended network node of the plurality of extended network nodes a second port from the first network configuration to the second network configuration.

4. The method of claim 3, further comprising:

opening the second root port at the root node to complete the second network configuration for the plurality of extended network nodes; and verifying connectivity to the plurality of extended network nodes in the second network configuration.

5. The method of claim 1, wherein closing the first traffic path and closing the first alternate traffic path during network reconfiguration prevents network traffic looping in the plurality of extended network nodes.

6. A system comprising:

a processor; and a memory comprising instructions which, when executed on the processor, performs an operation, the operation comprising:

closing a first traffic path in a first network configuration for a plurality of extended network nodes by closing a first root port for the first traffic path at a root node for the plurality of extended network nodes, wherein the plurality of extended network nodes use a first alternate traffic path for data traffic transmission, wherein the plurality of extended network nodes use the first alternate traffic path via a second root port at the root node;

configuring a first set of ports in the plurality of extended network nodes to define a second traffic path in a second network configuration for the plurality of extended network nodes by:

reconfiguring a first port from the first network configuration to the second network configuration, wherein the first port is at first extended network node of the plurality of extended network nodes, wherein the first extended network node is first hop proximate to the root node; and reconfiguring at each next subsequent extended network node of the plurality of extended network nodes a first port from the first network configuration to the second network configuration;

closing the first alternate traffic path to cause the plurality of extended network nodes to use the second traffic path in the second network configuration for the data traffic transmission; and configuring a second set of ports in the plurality of extended network nodes in the first network configuration into the second network configuration.

7. The system of claim 6, wherein closing the first alternate traffic path comprises:

closing the second root port at the root node for the first alternate traffic path at the root node for the plurality of extended network nodes; and opening the first root port for the first traffic path at the root node.

8. The system of claim 7, wherein configuring the second set of ports in the plurality of extended network nodes in the first network configuration into the second network configuration comprises:

reconfiguring the first root port and the second root port from the first network configuration to the second network configuration;

reconfiguring a second port from the first network configuration to the second network configuration, wherein the second port is at the first extended network node of the plurality of extended network nodes; and reconfiguring at each next subsequent extended network node of the plurality of extended network nodes a second port from the first network configuration to the second network configuration.

9. The system of claim 8, wherein the operation further comprises:

opening the second root port at the root node to complete the second network configuration for the plurality of extended network nodes; and verifying connectivity to the plurality of extended network nodes in the second network configuration.

10. The system of claim 6, wherein closing the first traffic path and closing the first alternate traffic path during network reconfiguration prevents network traffic looping in the plurality of extended network nodes.

11. A computer program product comprising a non-transitory computer-readable medium program having program instructions embodied therewith, the program instructions executable by a processor to perform an operation comprising:

closing a first traffic path in a first network configuration for a plurality of extended network nodes by closing a first root port for the first traffic path at a root node for the plurality of extended network nodes, wherein the plurality of extended network nodes use a first alternate traffic path for data traffic transmission, wherein the plurality of extended network nodes use the first alternate traffic path via a second root port at the root node;

configuring a first set of ports in the plurality of extended network nodes to define a second traffic path in a second network configuration for the plurality of extended network nodes by:

reconfiguring a first port from the first network configuration to the second network configuration, wherein the first port is at first extended network node of the plurality of extended network nodes, wherein the first extended network node is first hop proximate to the root node; and reconfiguring at each next subsequent extended network node of the plurality of extended network nodes a first port from the first network configuration to the second network configuration;

closing the first alternate traffic path to cause the plurality of extended network nodes to use the second traffic path in the second network configuration for the data traffic transmission; and configuring a second set of ports in the plurality of extended network nodes in the first network configuration into the second network configuration.

12. The computer program product of claim 11, wherein closing the first alternate traffic path comprises:

closing the second root port at the root node for the first alternate traffic path at the root node for the plurality of extended network nodes; and opening the first root port for the first traffic path at the root node.

13. The computer program product of claim 12, wherein configuring the second set of ports in the plurality of extended network nodes in the first network configuration into the second network configuration comprises:

reconfiguring the first root port and the second root port from the first network configuration to the second network configuration;

reconfiguring a second port from the first network configuration to the second network configuration, wherein the second port is at the first extended network node of the plurality of extended network nodes; and reconfiguring at each next subsequent extended network node of the plurality of extended network nodes a second port from the first network configuration to the second network configuration.

14. The computer program product of claim 13, wherein the operation further comprises:

opening the second root port at the root node to complete the second network configuration for the plurality of extended network nodes; and verifying connectivity to the plurality of extended network nodes in the second network configuration.

* * * * *